United States Patent
Chiang et al.

[11] Patent Number: 5,986,038
[45] Date of Patent: Nov. 16, 1999

[54] ADHESIVE COMPOSITION

[75] Inventors: Lin-chiu Chiang; Jenq-Tain Lin, both of Kitaibaraki, Taiwan; Haruyoshi Tatsu, Hitachi, Japan; Lev Moiseevich Kogan, Saint Petersburg, Russian Federation; Anatoli Stepanovich Skornyakov, Saint Petersburg, Russian Federation; Tat'yana Borisovna Zapevalova, Saint Petersburg, Russian Federation; Olga Viktorinovna Blagodatova, Saint Petersburg, Russian Federation; Sergei Vasil'evich Sokolov, Saint Petersburg, Russian Federation

[73] Assignees: Nippon Mektron, Limited, Tokyo, Japan; The Central Synthetic Rubbers Research Institute, St. Petersburg, Russian Federation

[21] Appl. No.: 09/035,324

[22] Filed: Mar. 5, 1998

[30] Foreign Application Priority Data

Mar. 5, 1997 [JP] Japan ................................ 9-067250

[51] Int. Cl.$^6$ ........................................... C08L 79/00
[52] U.S. Cl. ............................ 528/229; 528/27; 528/87; 528/228; 525/326.2; 525/327.3; 525/331.4; 525/331.5; 525/331.7
[58] Field of Search ...................... 528/228, 229, 528/27, 87; 525/326.2, 327.3, 331.4, 331.5, 331.7

[56] References Cited

U.S. PATENT DOCUMENTS

| | | | |
|---|---|---|---|
| 4,182,644 | 1/1980 | Briggs, Jr. et al. | 156/310 |
| 4,339,565 | 7/1982 | Tomoda | 528/27 |
| 5,814,715 | 9/1998 | Chen et al. | 526/348.6 |
| 5,859,181 | 1/1999 | Zhao et al. | 528/353 |

*Primary Examiner*—P. Hampton-Hightower
*Attorney, Agent, or Firm*—Barnes & Thornburg

[57] ABSTRACT

An adhesive composition comprising a fluorinated elastomer having dicyclopropane rings formed by reaction of chloroform with unsaturated bonds introduced into the molecule of fluorinated elastomer by an alkali treatment, as an adhesive component has a good room temperature adhesiveness and very distinguished electric characteristics perse such as a high insulation resistance, a low dielectric constant, a low dielectric loss tangent, etc. and is effectively applied to adhesion of electronic materials in printed substrates, etc.

13 Claims, No Drawings

ADHESIVE COMPOSITION

BACKGROUND OF THE INVENTION

1. Field of the Invention

The present invention relates to an adhesive composition and more particularly to an adhesive composition suitably applicable to electronic materials such as printed substrates, etc.

2. Related Art

Recently, development of heat-resistant adhesives, particularly organic heat-resistant adhesives is in progress. Organic heat-resistant adhesives include, for example, polybenzoimidazole-type, polyimide-type, polyamideimide-type, fluorohydrocarbon resin-type, silicone-type, epoxyphenol-type, epoxy novolak-type, epoxy acryl-type, nitrilephenol-type ones, etc., among which it is noted that polyimide-polybenzoimidazole-type adhesives have a distinguished heat-resistant adhesiveness.

However, the polyimide-polybenzoimidazole-type adhesives have such problems as a higher curing temperature for developing the adhesiveness, generation of water during the reaction, etc. That is, heat-resistant adhesives that are satisfactory for all such characteristics as a long-term heat resistance, an adhesiveness, curing conditions, etc. have not been available yet.

SUMMARY OF THE INVENTION

An object of the present invention is to provide an adhesive composition effectively applicable to bonding of electronic materials such as printed substrates, etc., which has a good room temperature adhesiveness and also has much distinguished electric characteristics per se, for example, a high insulation resistance, a low dielectric constant, a low dielectric loss tangent, etc.

An adhesive composition according to the present invention comprises a fluorinated elastomer having dichlorocyclopropane rings formed by reaction of chloroform with unsaturated bonds introduced into the molecule of fluorinated elastomer by an alkali treatment, as an adhesive component.

DETAILED DESCRIPTION OF THE INVENTION

Generally, vinylidene fluoride-hexafluoropropene copolymers can be used in the present invention as a fluorinated elastomer. A copolymerization ratio of vinylidene fluoride to hexafluoropropene in the copolymer is about 2.5— about 5.5:1, preferably about 3.5— about 5:1 by mole. The copolymers may be further copolymerized with a fluorinated olefin, an olefin, a vinyl compound, etc. for example, tetrafluoroethylene, ethylene, propylene, alkyl vinyl ether, hexafluoroisobutene, vinyl acetate, etc.

These vinylidene fluoride-hexafluoropropene copolymers can be readily dehydrofluorinated by treatment with an alkaline compound such as potassium hydroxide, sodium hydroxide, cesium hydroxide, calcium hydroxide, calcium carbonate, triethylamine, etc. at room temperature to about 70° C., preferably about 40° C. to about 60° C. to form unsaturated bonds in the copolymer molecule. It is desirable that the copolymer molecule contains about 0.1 to about 30%, preferably about 0.5 to about 5% of the unsaturated bonds. The dehydrofluorination reaction can be carried in the presence of a ketone-type solvent such as acetone, methyl ethyl ketone, etc. By simultaneous or sequential addition of chloroform to the reaction system, successive dichlorocyclopropane ring formation reaction can be carried out in the same reaction system.

Fluorinated elastomers having about 0.5 to 5% by mole, preferably about 3.5 to 5% by mole, of dichlorocyclopropane rings (as calculated on the reduction of unsaturated bonds) formed by reaction of chloroform with the unsaturated bonds introduced into the molecule by the alkali treatment are used as an adhesive component of the adhesive composition according to the present invention. When vinylene fluoride-hexafluoropropene copolymers are used as fluorinated elastomers, double bonds formed on the hexafluoropropene moieties (double bonds at the hexafluoropropene base) react with chloroform, as shown by the following reaction equation, to form dichlorocyclopropane rings:

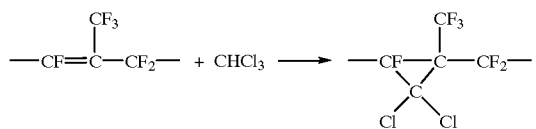

The adhesive composition containing such a fluorinated elastomer having dichlorocyclopropane rings as an adhesive component can be generally prepared into an organic solvent solution having a solid concentration of about 1 to about 50% by weight, preferably about 20 to about 30% by weight. The organic solvent for this purpose includes, for example, acetone, methyl ethyl ketone, ethyl acetate, etc.

To the adhesive composition generally prepared as an organic solvent solution can be added about 0.05 to about 50 parts by weight, preferably about 0.2 to about 20 parts by weight, of a polyamine compound such as m-xylylenediamine, diaminodiphenylsulfone, diaminodiphenylmethane,etc. as a curing agent, per 100 parts by weight of the adhesive component. Above 50 parts by weight, the adhesive strength will be lowered, and particularly when a polyimide film is used as a material to be adhered, the adhered film will be deteriorated.

Furthermore, in order to make the curing agent work fully, thereby increasing the hardness, an epoxy resin can be added to the adhesive composition. The epoxy resin can be any of bisphenol A type resin, biphenyl type resin, glycidylamine type resin, novolak type resin, etc. and can be used in a proportion of about 1 to about 50 parts by weight, preferably about 2 to about 20 parts by weight, per 100 parts by weight of the adhesive component.

Furthermore, about 1 to about 50 parts by weight, preferably about 2 to about 20 parts by weight, of filler particles (primary particle size about 1 to about 1,000 nm, preferably about 10 to about 50 nm) such as $TiO_2$, $Fe_2O_3$, ZnO, $SiO_2$, surface-treated $SiO_2$, Al $(OH)_3$, sulfur, fluorocarbon, etc., per 100 parts by weight of the adhesive component can be added to the adhesive composition. Additon of the filler can improve the tackness, but too much addition of the filler will lower the adhesive strength of coating film or the cohesion of the coating film itself, resulting in failure to obtain a uniform coating of the adhesive composition.

An organic solvent solution of the adhesive composition containing at least one of these additives can be applied to a material to be adhered, followed by evaporating off the organic solvent at a temperature of about 50° to about 185° C. and curing even at room temperature under a superatmospheric condition of about 1 to 100 kg/cm² gage.

The present adhesive composition contains a fluorinated elastomer as an adhesive component and thus is characterized by having an adhesion even under room temperature condition in addition to an inherent good heat resistance, and further has very distinguished electric characteristics in respect to insulation resistance, dielectric constant, dielectric loss tangent, etc. and also a good antitackness. Thus, the present adhesive composition can be effectively applied as an adhesive for electronic materials such as printed substrates, etc.

PREFERRED EMBODIMENTS OF THE INVENTION

The present invention will be described in detail below, referring to Examples.

EXAMPLES 1

Into a three-necked flask having a capacity of 500 ml provided a stirrer and a reflux cooler were charged 20 g of a fluorinated copolymer consisting of vinylidene fluoride-hexafluoropropene copolymer having a weight average molecular weight (Mw) of about 300,000 and 180 g of acetone. While vigorously stirring the solution at 25° C. (room temperature), 35 g of chloroform and a 25 wt. % alcohol solution containing 3.3 g of potassium hydroxide, as dissolved therein, was poured into the solution, followed by farther stirring for one hour. After the completion of reaction, the reaction mixture was poured into water to reprecipitate the polymer. The precipitated polymer was washed with water and dried in reduced pressure at about 40° to about 50° C. for 10 hours.

$^{19}$F-NMR spectra of the resulting fluorinated elastomer confirmed by the presence of a peak at about 148 ppm due to the double bonds of HFP bases, and also infrared absorption spectra thereof confirmed the presence of peaks at 1680, 1720 and 1760 cm$^{-1}$ due to the double bonds of HFP bases. Formation of dichlorocyclopropane rings was confirmed by the disappearance of the HFP peak at about 148 ppm, in a proportion of 1% by mole on the basis of the elastomer.

EXAMPLE 2

To 100 parts by weight of the fluorinated elastomer having dichlorocyclopropane rings obtained in Example 1 were added 10 parts by weight of epoxy resin (Epikote 604, trademark of a product commercially available from Mitsubishi Chemical Corp., Japan) and 10 parts by weight of diaminodiphenylsulfone as a curing agent to prepare an adhesive composition as a methyl ethyl ketone solution having a solid concentration of 20% by weight.

The resulting adhesive composition was applied to a polyimide film (Capton 100-H, trademark of a product commercially available from Toray-Dupont Co., Ltd, Japan); thickness: 25 μm), followed by drying in an atmosphere at 140° C. for 5 minutes, thereby Forming an adhesive layer having a film thickness of 30 μm. Then, a rolled copper foil (thickness: 35 μm) was laid thereon by lamination at 185° C. and 60 kg/cm² for 70 seconds. Then, another same adhesive layer as above was formed on the rolled copper foil, and then a plasma surface-treated tetrafluoroethylene resin (PTFE) film (thickness: 25 μm) was further laid thereon by lamination at 185° C. and 60 kg/cm² for 70 seconds. Then, the laminate was cured in the following schedule: temperature elevation from 40° to 130° C. over one hour; temperature elevation from 130° to 180° C. over 12 hours and curing at 180° C. for one hour, to prepare an evaluation sample.

The evaluation sample was determined for room temperature adhesive strength by a peel test according to JIS C-5016 and also for electric characteristics by an LCR meter (model 4285A commercially available from YHP Co., Ltd, Japan). The following results were obtained. Measurement values in the parenthesis are those with fluorinated elastomer having no dichlorocyclopropane rings.

| [Room temperature adhesive strength (kg/cm)] | |
|---|---|
| Between surface-treated PTFE film and copper foil | 0.5–0.9(0.56) |
| Between copper foil and polyimide film | 0.8–1.2(0.8–1.0) |
| [Electric characteristics] | |
| Relative dielectric constant | 3.5 ± 0.4(8.5) |
| Dielectric loss tangent | 0.054 ± 0.01(0.047) |
| Volume resistivity (Ω · cm) | 2.6 × 10$^{16}$(1.4 × 10$^{12}$) |

What is claimed is:

1. An adhesive composition, which comprises a fluorinated elastomer having dichlorocyclopropane rings formed by reaction of chloroform with unsaturated bonds introduced into the molecule of fluorinated elastomer by an alkali treatment, as an adhesive component.

2. An adhesive composition according to claim 1, wherein the fluorinated elastomer has about 0.5 to about 5% by mole of the dichlorocyclopropane rings.

3. An adhesive composition according to claim 1, wherein a polyamine compound is further contained as a curing agent.

4. An adhesive composition according to claim 3, wherein about 0.05 to about 50 parts by weight of the polyamine compound is contained per 100 parts by weight of the adhesive component.

5. An adhesive composition according to claim 1, wherein an epoxy resin is further contained.

6. An adhesive composition according to claim 5, wherein about 1 to about 50 parts by weight of the epoxy resin was contained per 100 parts by weight of the adhesive component.

7. An adhesive composition according to claim 1 for use in adhesion of electronic materials.

8. A process for preparing an adhesive fluorinated elastomer, which comprises adding an alkaline compound and chloroform to a fluorinated elastomer, thereby forming unsaturated bonds in the molecule of the fluorinated elastomer and dichlorocyclopropane rings at the sites of the unsaturated bonds.

9. A process according to claim 8, wherein the fluorinated elastomer is a vinylidene fluoride-hexafluoropropene copolymer.

10. A process according to claim 9, wherein the vinylidene fluoride-hexafluoropropene copolymer has a copolymerization ratio of vinylidene fluoride to hexafluoropropene by mole of 2.5–5.5:1.

11. A process according to claim 8, wherein the alkaline compound is potassium hydroxide, sodium hydroxide, cesium hydroxide, calcium hydroxide, calcium carbonate or triethylamine and is subjected to treatment of the fluorinated elastomer at room temperature to about 70° C.

12. A process according to claim 8, wherein the alkaline compound and chloroform are added to the fluorinated elastomer simultaneously.

13. A process according to claim 8, wherein the alkaline compound is added to the fluorinated elastomer, followed by addition of the chloroform thereto.

* * * * *